United States Patent
Morse et al.

(10) Patent No.: US 9,611,168 B2
(45) Date of Patent: Apr. 4, 2017

(54) METHOD AND APPARATUS FOR CREATING COHERENT BUNDLE OF SCINTILLATING FIBERS

(71) Applicant: Brown University, Providence, RI (US)

(72) Inventors: Theodore F. Morse, Boston, MA (US); Rajiv Gupta, Wayland, MA (US); Avilash Cramer, Lynnfield, MA (US); Chistopher Bull, Rehoboth, MA (US); Paul Waltz, Seekonk, MA (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 14/640,069

(22) Filed: Mar. 6, 2015

(65) Prior Publication Data
US 2015/0253433 A1 Sep. 10, 2015

Related U.S. Application Data

(60) Provisional application No. 61/949,192, filed on Mar. 6, 2014.

(51) Int. Cl.
*G01J 1/58* (2006.01)
*C03B 37/012* (2006.01)
(Continued)

(52) U.S. Cl.
CPC ........ *C03B 37/01262* (2013.01); *B29C 43/00* (2013.01); *G01T 1/201* (2013.01);
(Continued)

(58) Field of Classification Search
CPC .............................. G01T 1/201; G01T 1/2033
See application file for complete search history.

(56) References Cited

U.S. PATENT DOCUMENTS 4,022,647 A * 5/1977 Yevick ...................... B32B 3/18
156/182
8,477,906 B2 7/2013 Morse et al.
(Continued)

FOREIGN PATENT DOCUMENTS

SE      200800231 A * 9/2009
WO   WO 2009/008911   1/2009

OTHER PUBLICATIONS

SCHOTT North America, Inc., "An introduction to Fiber Optic Imaging", Feb. 2007.*
(Continued)

*Primary Examiner* — Kiho Kim
(74) *Attorney, Agent, or Firm* — Adler Pollock & Sheehan P.C.; Daniel J. Holmander, Esq.; George N. Chaclas, Esq.

(57) ABSTRACT

A method and apparatus to manufacture a coherent bundle of scintillating fibers is disclosed. In the method and apparatus, a polymer matrix of a transparent polymer and nanoparticle scintillators is placed on top of a collimated bundle having a plurality of capillaries and pressed in a pressure vessel until the polymer matrix is forced into the capillaries. Pressure is applied via an anvil on top of the polymer matrix. To prevent fracturing of the collimated bundle during pressing, back pressure is supplied to the pressure vessel via a valve, which controls a supply of high pressure gas. Alternatively, the back pressure may also be supplied by a press (and or pressure) and support to the collimated bundle is provided by a high melting point thermoplastic. Heat may be applied to the polymer matrix via the anvil to speed the pressing operation due to the viscosity of the polymer.

12 Claims, 5 Drawing Sheets

(51) Int. Cl.
  *B29C 43/00*    (2006.01)
  *G01T 1/20*     (2006.01)
  *B29K 27/12*    (2006.01)
  *B82Y 15/00*    (2011.01)

(52) U.S. Cl.
  CPC .......... *B29K 2027/12* (2013.01); *B82Y 15/00* (2013.01); *C03B 2203/40* (2013.01)

(56) References Cited

U.S. PATENT DOCUMENTS

2002/0072111 A1* 6/2002 Clarkin ............. B01L 3/502707
   435/287.1
2014/0323946 A1* 10/2014 Bourke, Jr. ........ A61K 41/0085
   604/20

OTHER PUBLICATIONS

International Search Report, International Application No. PCT/US2015/019114; Jun. 10, 2015, 1page.

* cited by examiner

METHOD AND APPARATUS FOR CREATING COHERENT BUNDLE OF SCINTILLATING FIBERS

CROSS-REFERENCE TO RELATED APPLICATION

This application claims priority to earlier filed U.S. Provisional Application Ser. No. 61/949,192, filed Mar. 6, 2014, the contents of which are incorporated herein by reference.

BACKGROUND OF THE INVENTION

1. Field of the Invention

The present patent document relates generally to coherent bundles of scintillating fibers used as detectors for x-rays used for medical, scientific and engineering imaging applications, and methods and apparatuses for the creation thereof.

2. Background of the Related Art

Coherent bundles of scintillating fibers are useful for detecting x-rays and are placed opposed to a CCD or CMOS camera. Incident x-rays activate the scintillators in individual fibers, which then emit visible light to the camera, which then generates an image. Coherent bundles are used extensively in medical, scientific and engineering applications. Particularly in the medical imaging field, coherent bundles are instrumental in creating images later used to diagnose cancer, heart disease and other ailments. In engineering fields, parts may be imaged to determine if they have micro-fractures, which may lead to premature failure of the part, such as turbine blades in a jet engine. In domestic security, x-ray imaging is used for scanning of packages, luggage and persons for weapons and contraband.

Consequently, it is desirable to have high resolution images. The size of the scintillators is correlated the maximum resolution that can be imaged. Consequently, it is desirable to have coherent bundles of fibers with small diameter scintillating fibers in order to increase resolution in images.

Therefore, there is a need in the art for coherent bundles of scintillating fibers that produce higher resolution images.

SUMMARY OF THE INVENTION

The method of making and coherent bundle described herein advance the prior art by providing a coherent bundle of scintillating fibers and method of making that increases the resolution of x-ray images in to the single-digit micron range by controlling the pressure during manufacturing of the coherent bundle. Specifically, the method of manufacturing a coherent bundle of scintillating fibers, includes providing a collimated bundle having a glass preform with a plurality of capillaries. A polymer matrix of a transparent polymer infused with scintillating nanoparticles is placed on top of the collimated bundle. Pressure is applied to the polymer matrix, driving it into the capillaries while a back pressure is applied to the collimated bundle thereby reducing the risk of failure of the collimated bundle.

In one embodiment, a pressure vessel is provided that uniquely provides pressure to force the polymer matrix into the collimated bundle and back pressure to moderate the tension to the collimated bundle cause by the pressure. The pressure vessel includes an inner wall forming a chamber inside the pressure vessel and top surface defining a first opening into the chamber. An inner shoulder extends inwardly from the inner wall of the pressure chamber and forms support for a collimated bundle. A surface defining a bore and second opening into the chamber below the inner shoulder is also included. An anvil is configured and arranged to apply pressure to the pressure chamber of the pressure vessel through the first opening. A valve connected to the bottom opening is configured and arranged to supply and control back pressure to the chamber.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 3:
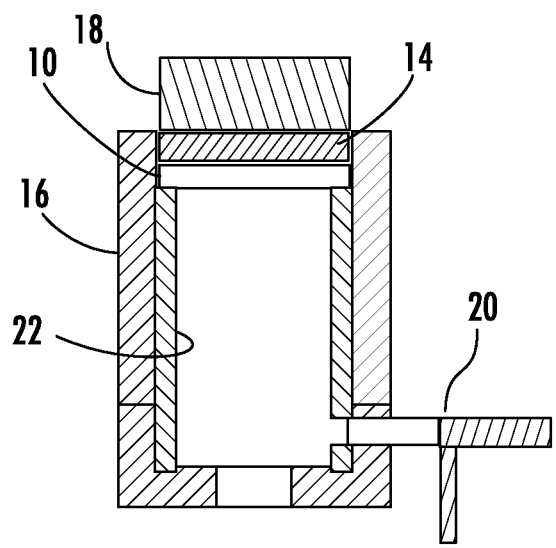
FIG. 3 is an illustration of a pressure vessel having a collimated bundle and polymer matrix loaded and ready for pressing.
Figure 4:
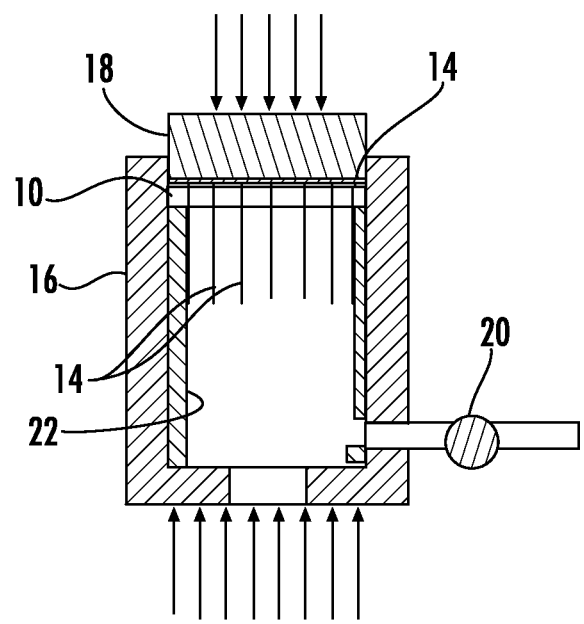
FIG. 4 is an illustration of a pressure vessel with pressure being applied to the polymer matrix while back pressure is applied to the collimated bundle.
Figures 10A, 10B:
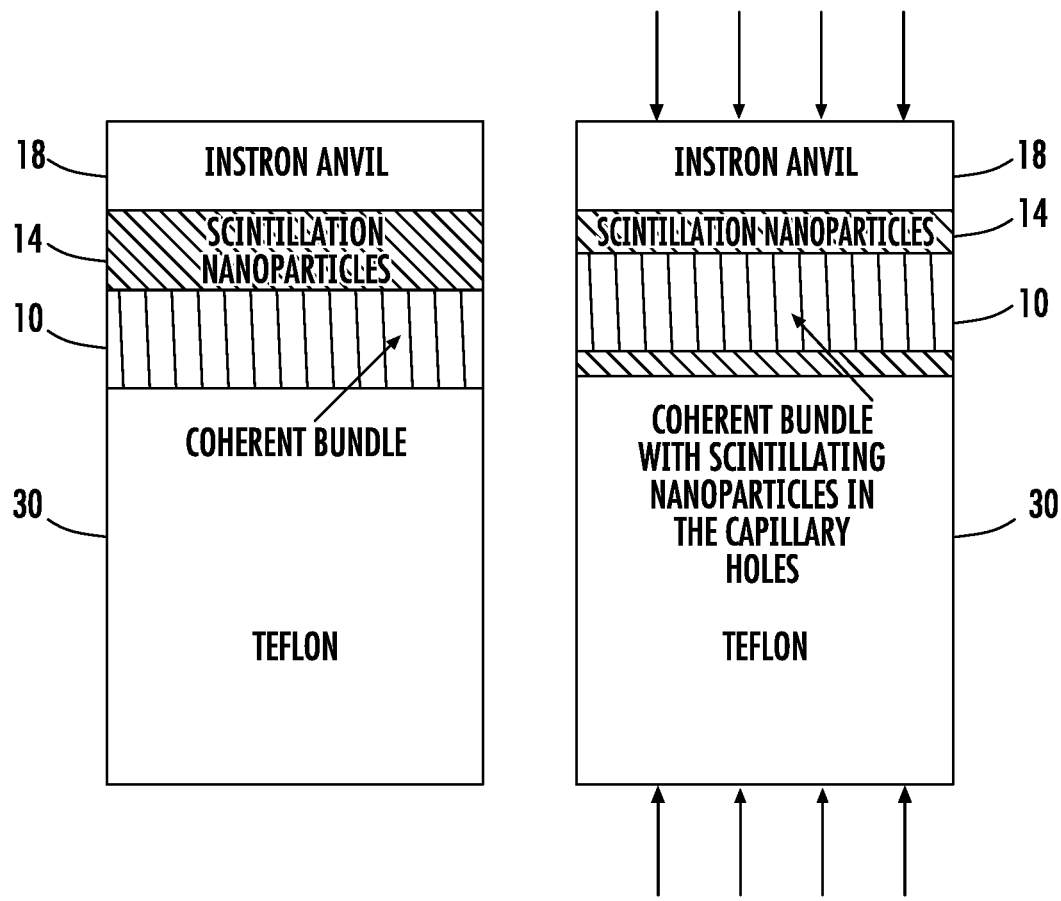
FIG. 10A is an illustration of an alternative method of pressing a polymer matrix into a collimated bundle.
FIG. 10B is an illustration of an alternative method of pressing a polymer matrix into a collimated bundle, showing the polymer matrix being pressed into the capillaries of the collimated bundle.

Referring to FIGS. 3 and 4, the method and apparatus to manufacture a coherent bundle of scintillating fibers is shown generally. As will be described in greater detail below, in the method and apparatus, a polymer matrix 14 of a transparent polymer and nanoparticle scintillators is placed on top of a collimated bundle 10 having a plurality of capillaries and pressed in a pressure vessel 16 until the polymer matrix 14 is forced into the capillaries. Pressure is applied via an anvil 18. To prevent fracturing of the collimated bundle 10 during pressing, back pressure is supplied to the pressure vessel 16 via a valve 20, which controls a supply of high pressure gas. Alternatively, as shown in FIGS. 10A and 10B, the back pressure may also be supplied by a press and support to the collimated bundle is provided by a high melting point thermoplastic. Heat may be applied to the polymer matrix to speed the pressing operation.

Figure 1:
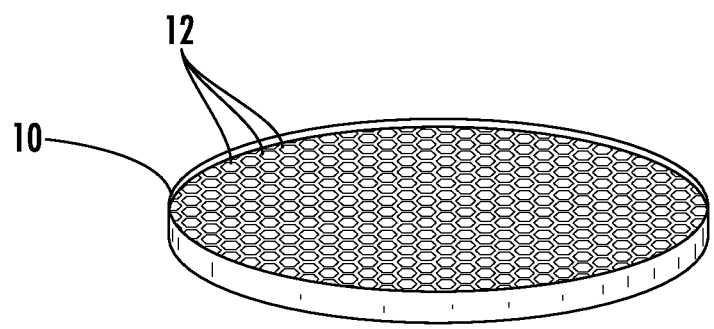
FIG. 1 is a perspective view of a collimated bundle having a plurality of capillaries.
Figure 2A:
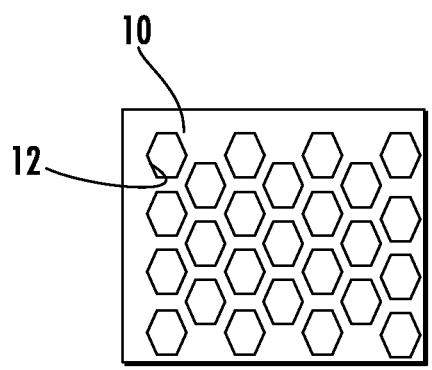
FIG. 2A is an illustration of a collimated bundle with hexagonal capillaries.
Figure 2B:
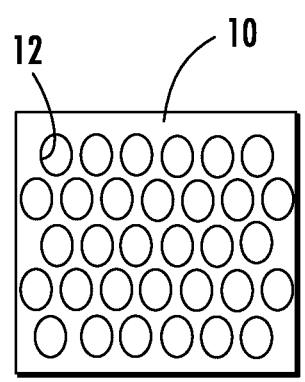
FIG. 2B is an illustration of a collimated bundle with circular capillaries.

Referring back now to FIG. 1, an illustration of collimated bundle is shown generally at 10. Collimated bundles 10 are formed from glass from preforms that are drawn, stacked into bundles, and redrawn many times. The voids between the drawn glass fibers form the capillaries 12 with a characteristic dimension as small as 3-15 microns. There may be 6.25×10⁷ capillaries 12 formed in the collimated bundle 10. The capillaries have a cross-sectional shape. FIG. 2A shows a collimated bundle 10 having a plurality of hexagonal capillaries 12. FIG. 2B shows an illustration of a collimated bundle 10 having a plurality of circular capillaries 12. Other profiles or shapes of the capillaries 12 may be formed. The collimated bundles 10 are formed into round disks and may be about 25 mm in diameter, 2 mm thick with an index of refraction of 1.49-1.53, typically of borosilicate glass. Other diameters and thicknesses may be used depending on the desired size of the detector.

Nanoparticle scintillators are embedded into a transparent polymer to create a scintillating material, which will subsequently be force through the capillaries 12 of the collimated bundle 10. The scintillator infused polymer forms a polymer matrix 14, which will form the 'cores' of our scintillating fibers, and the glass of the collimated bundle 10 the 'cladding' on the fibers. As stated above, the latter has a refractive index of 1.49-1.53; the polymer will have a refractive index of at least 1.60 (although since it is doped with the scintillating nanoparticles, the actual refractive index of the cores will be much higher). Suitable polymers are preferably thermoplastics and more preferably polystyrene, nylon and polypropylene, other transparent polymers that have a refractive index higher than 1.59 may be suitableSuitable nanoparticle scintillator materials are LaBr(3):Ce, LSO:Ce and GdAlO(3):Ce. Other nanoparticle scintillator materials may be used. U.S. Publication 2008/0093557 and U.S. Publication 2010/2072234, incorporated herein by reference, describe scintillator materials and methods of embedding them in plastics.

It is important to note that the resolution limit of the coherent bundle is almost that of the material itself. Accordingly, by using scintillating fibers of 3-15 microns, x-rays with a resolution in the micron range will be detected, a significant improvement over both computed axial tomography (CAT), which had a resolution of 150 microns, and current digital x-ray detectors, which have a resolution of 30 microns.

The collimated bundle 10 is able to withstand a force required to push the polymer matrix 14 through the capillaries 12 in the collimated bundle 10 disk, which may be made from borosilicate glass, which is able to withstand 63-81 GPa in compression (the lower bound is equivalent to 6.2E4 atmospheres). It is much less strong in tension, and the glass of the collimated bundle will crack under the bending load.

Referring to FIGS. 3 and 4, a successful way to push scintillating particles into the capillaries 12 of the collimated bundle 10 is described below. A polymer infused with nanoparticle scintillators, forming a polymer matrix 14, is forced into the capillaries 12 of the collimated bundle 10. To avoid damaging the collimated bundle 10, sufficient back pressure will be applied on the exit side of the capillaries 12 so that the unbalanced force on the collimated bundle 10 (i.e. tension) is able to withstand the critical fracture load of bending.

Figure 5:
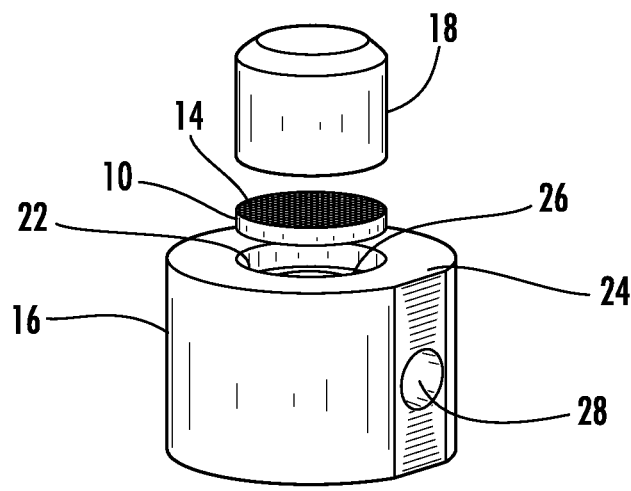
FIG. 5 shows an exploded view of an exemplary pressure vessel.
Figure 6:
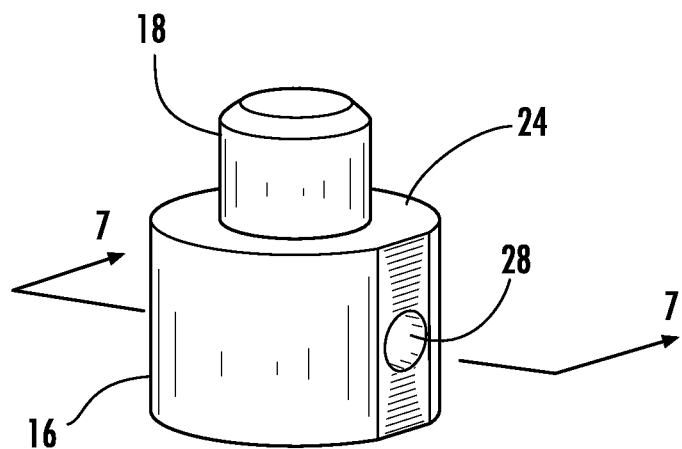
FIG. 6 shows a perspective view of an exemplary pressure vessel.
Figure 7:
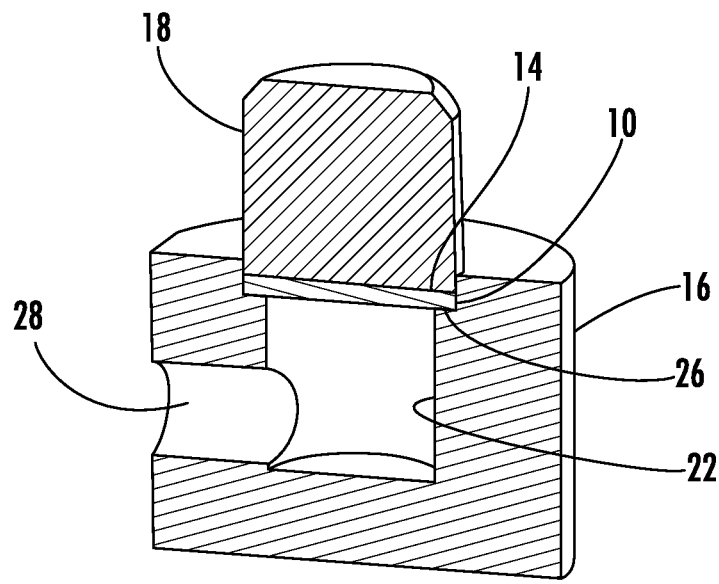
FIG. 7 shows a cross-section view through line 7-7 of FIG. 6.

FIGS. 5-7 show an exemplary embodiment of a pressure vessel 16 configured to force the polymer matrix 14 into the capillaries 12 of the collimated bundle 10. The pressure vessel 16 is a cylindrical structure having an inner wall 22 forming a chamber inside the pressure vessel 16. The pressure vessel includes a top surface 24, which with the inner wall 22 define a first opening into the chamber where the collimated bundle 10 and polymer matrix 14 are loaded for pressing. An inner shoulder 26 extends inwardly from the inner wall of the pressure chamber forming support for a collimated bundle 10 and polymer matrix 14 stack. A surface defining a bore 28 and second opening into chamber is below the inner shoulder 26 and consequently beneath the collimated bundle 10 and polymer matrix 14 stack (when loaded into the pressure vessel 16). An anvil 18 is placed on top of the polymer matrix 14 and collimated bundle 10 for applying pressure to the pressure chamber of the pressure vessel through the first opening. During operation, pressure is applied to the anvil 18, via a press, which presses the polymer matrix 14, forcing it through the capillaries 12 of the collimated bundle 10. Optionally, heat may be applied through the anvil 18 and/or the pressure vessel 16 to the polymer matrix 14 to soften the polymer matrix 14 and speed the pressing operation.

Figure 8:
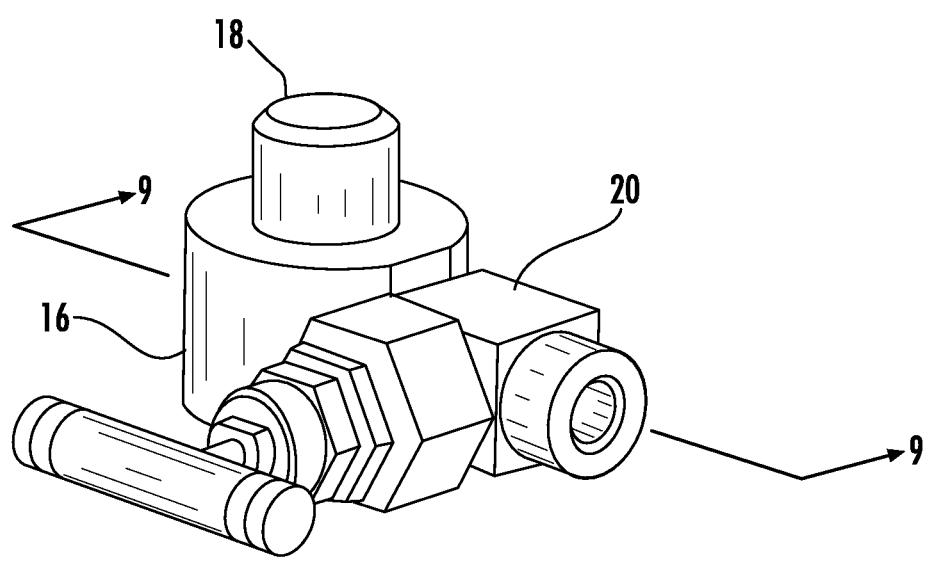
FIG. 8 shows a perspective view of an exemplary pressure vessel with a valve to supply and control back pressure attached thereto.
Figure 9:
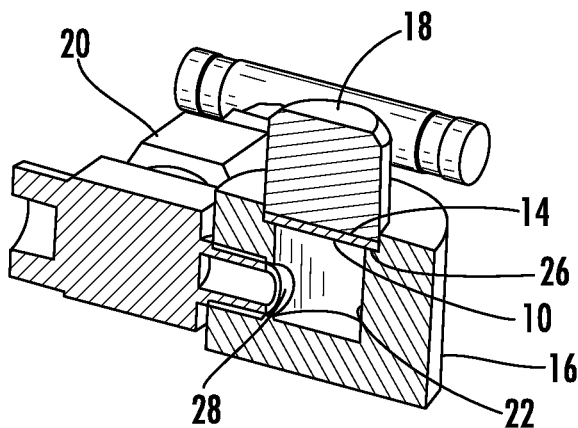
FIG. 9 is a cross-section view through line 9-9 of FIG. 8.

Referring to FIGS. 8 and 9, a valve connected to the bottom opening and is configured to supply and control back pressure to the chamber. Preferably a high pressure gas is used to supply the back pressure. The valve may be a needle valve.

The technique for accomplishing the creation of the coherent bundle of scintillating fibers is demonstrated in the following:

From Poiseuille's law, the volumetric flow rate Q through a single capillary of radius r and length L1, subject to a pressure difference ΔP, for a fluid with absolute viscosity η is given as $$Q = \frac{\pi r^4 \Delta P}{8 \eta L_1}$$

The pressure distribution is linear along the capillary length. If we depict the capillaries as comprising a collimated bundle, the pressure distribution is linear throughout and the same across each capillary. In the scheme shown there will be no pressure drop between the collimated bundle and the exit disk because the pressure drop created by the capillaries is much greater than that created by the much larger diameter pressure cell.

$$\Delta P_{\substack{pressure \\ vessel}} = \Delta P \left(1 - \frac{L_1}{L_{total}}\right)$$

The total flow rate of the polymer through the disk is given by the flow through a single capillary times the number of capillaries, which we calculated here as the ratio of the collimated bundle area to a single capillary area. The total flow rate is also equal to the volume of the collimated bundle divided by the time it takes to fill the capillaries in the collimated bundle.

$$Q_{total} = \frac{\pi r^4 \Delta P_1}{8 \eta L_1} \frac{R^2}{r^2} = \frac{\pi R^2 L_1}{t}$$

If the exit valve is set at the pressure that the disk experiences, there will be a constant pressure along the whole of the coherent bundle. If the valve were sealed, the pressure vessel would be at the equal to the pressure across the piston. If the valve were open, the stress of the tension would rupture the glass.

$$t\Delta P = \frac{8\eta}{1 - \frac{L_1}{L_{total}}} \frac{L_1^2}{r^2}$$

We will provide for the pressure drop to be the equivalent of the flow through a capillary bundle. It is provided for an adjustment of the valve settings, and it corresponds to the $$L_{total} = L_1 + L_{valve}$$

The total resistance shall be given by the sum of the thickness of the coherent bundle, plus the resistance of the valve in the outflow.

$$\Delta P_1 = \Delta P\left(1 - \frac{L_1}{L_1 + L_{valve}}\right)$$

In a 25 mm collimated bundle the pressure and times may therefore be calculated. Specifically, R=25 mm, $\eta$=200 Pa-s, $L_1$=2 mm, r=2.5×10$^{-6}$ Consequently, the volume of the collimated bundle is: $\pi R^2 \times L_1/2$=490.8

Consequently, flow through the collimated bundle to infiltrate the capillaries is:

$$t\Delta P_1 = 1.024 \times 10^{+9}$$

The pressure relief valve is equal to the collimated bundle in the first case sited below: it is equal to the 2 mm thickness. In the second case, however, it is equal to 18 mm.

$$A = \Delta P_1 = \Delta P\left(1 - \frac{2}{2+2}\right)$$

$$B = \Delta P_1 = \Delta P\left(1 - \frac{2}{2+18}\right)$$

The Q refers to the mass flow in each of the respective cases, i.e. 490.8/t. The values for a 25 mm disk with 2 mm thickness may be tabulated as:

| atm | Pa | t | A | Q | t | B | Q |
|---|---|---|---|---|---|---|---|
| 1000 | 1.01E8 | 20.2 | 5.05E7 | 24.25 | 10.3 | 9.9E7 | 43.84 |
| 750 | 7.59E7 | 27.01 | 3.78E7 | 18.77 | 14.9 | 6.83E7 | 32.72 |
| 500 | 5.06E7 | 40.47 | 2.79E7 | 12.87 | 22.5 | 4.55E7 | 21.83 |
| 250 | 2.53E7 | 81.26 | 1.26E7 | 6.01 | 45.1 | 2.27E7 | 10.88 |

Referring to FIGS. 10A and 10B, an alternative method of forming the coherent bundle of scintillating fibers is shown where a press is configured to apply pressure to the polymer matrix 14 and back pressure to the collimated bundle 10 simultaneously. In this alternative method, the collimated bundle 10 is supported with a high melting point thermoplastic 30 such as polytetrafluoroethylene (i.e. Teflon).

Therefore, it can be seen that the present invention provides a unique solution to providing a coherent bundle of scintillating fibers that has markedly increased resolution than prior art x-ray detectors, thereby resulting in higher resolution and more accurate images in medical, engineering and scientific imaging using CT or CAT scanning technologies. The coherent bundle of scintillating fibers may also be used in other fields, such as domestic security and non-destructive testing.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method of manufacturing a coherent bundle of scintillating fibers, comprising:
    providing a collimated bundle having a glass preform with a plurality of capillaries therethrough;
    placing a polymer matrix of a transparent polymer infused with scintillating nanoparticles on top of the collimated bundle;
    applying pressure to the polymer matrix, driving it into the capillaries; and
    applying a back pressure to the collimated bundle;
    whereby the back pressure reduces the risk of failure of the collimated bundle.

2. The method of claim 1, further comprising placing the collimated bundle in a pressure vessel.

3. The method of claim 2, wherein the back pressure is applied by a high pressure gas.

4. The method of claim 1, further comprising supporting the collimated bundle with a high melting point polymer.

5. The method of claim 4, wherein the back pressure is applied by mechanical compression.

6. The method of claim 4, wherein the high melting point polymer is polytetrafluoroethylene.

7. The method of claim 1, wherein the polymer in the polymer matrix is a thermoplastic.

8. The method of claim 1, wherein the scintillating nanoparticles are selected from the group consisting of LaBr(3):Ce, LSO:Ce and GdAlO(3):Ce.

9. The method of claim 1, further comprising applying heat to the collimated bundle and polymer matrix.

10. An apparatus for manufacturing a coherent bundle of scintillating fibers, comprising:
    a pressure vessel having an inner wall forming a chamber inside the pressure vessel and top surface defining a first opening into the chamber, an inner shoulder extending inwardly from an inner wall of the pressure chamber forming support for a collimated bundle, and a surface defining a bore and second opening into the chamber below the inner shoulder;
    an anvil configured and arranged to apply pressure to the pressure chamber of the pressure vessel through the first opening; and
    a valve connected to the bottom opening configured and arranged to supply and control back pressure to the chamber.

11. The apparatus of claim 10, wherein the valve is a high pressure needle valve.

12. The apparatus of claim 10, wherein the pressure vessel is made of stainless steel.

* * * * *